(12) United States Patent
Ye et al.

(10) Patent No.: US 10,210,281 B2
(45) Date of Patent: Feb. 19, 2019

(54) METHOD AND SYSTEM FOR OBTAINING KNOWLEDGE POINT IMPLICIT RELATIONSHIP

(71) Applicants: PEKING UNIVERSITY FOUNDER GROUP CO., LTD., Beijing (CN); FOUNDER APABI TECHNOLOGY LIMITED, Beijing (CN); PEKING UNIVERSITY, Beijing (CN)

(72) Inventors: Mao Ye, Beijing (CN); Wei Wan, Beijing (CN); Jianbo Xu, Beijing (CN); Zhi Tang, Beijing (CN); Lifeng Jin, Beijing (CN)

(73) Assignees: PEKING UNIVERSITY FOUNDER GROUP CO., LTD., Beijing (CN); FOUNDER APABI TECHNOLOGY LIMITED, Beijing (CN); PEKING UNIVERSITY, Beijing (CN)

( * ) Notice: Subject to any disclaimer, the term of this patent is extended or adjusted under 35 U.S.C. 154(b) by 431 days.

(21) Appl. No.: 15/025,478

(22) PCT Filed: Dec. 6, 2013

(86) PCT No.: PCT/CN2013/088740
§ 371 (c)(1),
(2) Date: Mar. 28, 2016

(87) PCT Pub. No.: WO2015/043070
PCT Pub. Date: Apr. 2, 2015

(65) Prior Publication Data
US 2016/0210372 A1    Jul. 21, 2016

(30) Foreign Application Priority Data
Sep. 29, 2013    (CN) .......................... 2013 1 0456317

(51) Int. Cl.
*G06F 17/30*    (2006.01)
*G06N 5/00*    (2006.01)

(52) U.S. Cl.
CPC .. *G06F 17/30958* (2013.01); *G06F 17/30994* (2013.01); *G06N 5/00* (2013.01)

(58) Field of Classification Search
CPC ........ G06F 17/30958; G06F 17/30994; G06N 5/00
See application file for complete search history.

(56) References Cited

U.S. PATENT DOCUMENTS 8,463,777 B2 *  6/2013  Tokashiki ......... G06F 17/30991
                                                    707/727
9,367,823 B1 *  6/2016  Mihalik .............. G06F 17/3053
(Continued)

FOREIGN PATENT DOCUMENTS

CN    102195899 A    9/2011
CN    102622363 A    8/2012
(Continued)

OTHER PUBLICATIONS

Japanese Office Action for Japanese Patent Application No. 2016-517541, dated Sep. 5, 2017.
(Continued)

*Primary Examiner* — Jared M Bibbee
(74) *Attorney, Agent, or Firm* — Brinks Gilson & Lione (57) ABSTRACT

A method and system for obtaining a knowledge point implicit relationship are provided; first, establishing a knowledge point explicit relationship map according to knowledge point explicit relationship strengths; second, computing according to said knowledge point explicit relationship map a simple path set of two knowledge points; then, computing the implicit relationship strength values corresponding to each simple path in said simple path set; further, comparing the relationship strength values of the simple paths and setting as the significant implicit relationship strength value the simple path relationship strength having the largest value also greater than a preset threshold value. The described solution effectively avoids the problems of only using the relationship strengths between knowledge points and the ratio of relationship strengths to obtain the implicit relationship of knowledge points, the manner of (Continued)

searching for an implicit relationship being insufficiently accurate, and not performing normalization processing on the relationship strengths.

17 Claims, 2 Drawing Sheets

(56) References Cited

U.S. PATENT DOCUMENTS

| | | | | |
|---|---|---|---|---|
| 2012/0078612 | A1* | 3/2012 | Kandekar | G06F 17/2745 704/9 |
| 2012/0254310 | A1* | 10/2012 | Kamimaeda | G06F 17/30035 709/204 |
| 2012/0303600 | A1* | 11/2012 | Mukhopadhyay | G06F 17/274 707/706 |
| 2013/0066921 | A1* | 3/2013 | Mark | G06F 17/30734 707/794 |
| 2013/0144875 | A1* | 6/2013 | Hagiwara | G06F 17/3053 707/731 |

FOREIGN PATENT DOCUMENTS

| | | |
|---|---|---|
| CN | 102646096 A | 8/2012 |
| CN | 103235772 A | 8/2013 |
| JP | 2005122231 | 5/2005 |
| JP | 2006331343 | 12/2006 |
| JP | 2012190459 | 10/2012 |

OTHER PUBLICATIONS

Extended European Search Report for European Patent Application No. 13894858.3-1879, dated May 12, 2017.

Office Action for Japanese Patent Application No. 2016-517541, dated May 23, 2017.

* cited by examiner

METHOD AND SYSTEM FOR OBTAINING KNOWLEDGE POINT IMPLICIT RELATIONSHIP

CROSS-REFERENCE TO RELATED APPLICATIONS

This application is a national application of PCT/CN2013/088740, filed on Dec. 6, 2013, which application claims a right of priority to Chinese Patent Application No. 201310456317.1, filed Sep. 29, 2013, both of which are incorporated herein by reference in their entirety.

TECHNICAL FIELD

This invention relates to a method and a system for obtaining knowledge point implicit relationships, and belongs to electric digital data processing technology.

DESCRIPTION OF THE RELATED ART

Along with the arrival of knowledge economy, digital publication has become an inevitable trend in the publication industry. Many people have shifted from paper reading to electronic reading. A variety of publication resources such as electric books, magazines, digital newspapers contain a lot of authoritative knowledge and have high application value. These digital publication resources commonly spread knowledge and information in the form of documents and articles of books or magazines. What desired by readers is directly obtaining relative knowledge points from these documents, but not the documents themselves, that is, finding out all relative knowledge points in the art for the purpose of research and study.

Knowledge points have association relationships therebetween. Relationships that can be calculated directly from knowledge points and their explanations in the same text are referred to as "explicit relationships", and relationships that can be calculated indirectly from knowledge points and their explanations in different text are referred to as "implicit relationships". Encyclopedias as a digital publication resource comprise concise summaries of knowledge points. Knowledge points in encyclopedias (entries) describe names and explanations of knowledge points, wherein some other relative knowledge points are generally mentioned in the explanation portion. For example, in Encyclopedia of China—History of China, a knowledge point "Emperor Qin Shi Huang" is explained as "the first emperor of qin who unified china in 221 b.c., . . . , removed the prime minister Lu Buwei, and moved him to Sichuan Province . . . , in thirty-four years of Qin Shihuang, accepted suggestions of his prime minister Li Si(some contents are omitted which are noted by . . . )". It can be learned from the explanation that knowledge point "Qin Shi Huang" has an association relationship with knowledge point "Lu Buwei". Similarly, knowledge point "Qin Shi Huang" has an association relationship with knowledge point "Li Si". These relationships are explicit relationship in knowledge points and their explanations. However, in addition to explicit relationships, a plurality of implicit relationships may be present indirectly therebetween and implicit relationships may be more representative than explicit relationships. Therefore, it is necessary to further dig implicit relationships between knowledge points based on explicit relationships of knowledge points.

In the prior art, with a method of retrieving other knowledge points in explanation text of one knowledge point, explicit relationships between two knowledge points may be easily obtained. However, indirect implicit relationships are relationship strengths obtained depending on relationship strength between indirect knowledge points and a relationship strength ratio, wherein the relationship strength ratio means a ratio of explicit relationship strength of a knowledge point to a sum of strength of all of its relative knowledge points. This method of obtaining implicit relationship strength merely obtains implicit relationships between knowledge points in a relative manner, instead of analyzing all implicit relationship strengths in a knowledge system from a perspective of the whole knowledge system, implicit relationship strength is obtained using explicit relationship strength between knowledge points and a relationship strength ratio. This implicit relationship acquisition method may only acquire implicit relationships between knowledge points in a relative manner, resulting in insufficient accuracy. Meanwhile, for the acquisition of explicit relationship strength, the explicit relationship strength is calculated based on the occurrence number of a knowledge point in relative text segments, and no normalization is performed for relationship strength, causing a lack of an absolute measurable value for the determination of relationship strength. Thus, with the technical solution in the prior art, it is difficult to obtain representative implicit relationships.

SUMMARY OF THE INVENTION

A technical problem to be solved in this invention is the problem of insufficient accuracy of implicit relationship acquisition methods in the prior art, in which implicit relationships between knowledge points are only obtained based on relationship strength between knowledge points and a relationship strength ratio, and no normalization is performed for relationship strength, causing a lack of an absolute measurable value for the determination of relationship strength and making it difficult to obtain representative implicit relationships. Thus, a method and system is provided for obtaining most representative implicit relationships based on explicit relationships of knowledge points in a global space.

In order to solve the above problem, the following technical solution is given in this invention.

A method for obtaining knowledge point implicit relationships, comprising the following steps:

establishing a graph of knowledge point explicit relationships according to all knowledge points and their explanations; according to the graph of knowledge point explicit relationships, calculating a set of simple paths between two knowledge points; calculating implicit relationship strength corresponding to each simple path in the set of simple paths; comparing implicit relationship strength values of each simple path to set an implicit relationship strength value of a path having the largest value and greater than a predetermined threshold as significant implicit relationship strength.

Optionally, the process of establishing a graph of knowledge point explicit relationships according to all knowledge points and their explanations comprises the following steps: calculating knowledge point forward explicit relationships according to all knowledge points and their explanations and setting knowledge point forward explicit relationship strength values; calculating knowledge point backward explicit relationships according to a set of all knowledge points and their explanations and setting knowledge point backward explicit relationship strength values; according to the knowledge point forward explicit relationships and the knowledge point backward explicit relationships, calculating knowledge point explicit relationships and calculating explicit relationship strength values of the knowledge points; according to the explicit relationship strength values of the knowledge points, establishing a graph of knowledge point explicit relationships.

Optionally, the method of setting knowledge point forward explicit relationship strength comprises: if $(o_i,o_j) \in R_{ij}^P$, the forward explicit relationship strength from knowledge point $o_i$ to knowledge point $o_j$ is set to $f_P(i,j)=0.66$; if $(o_i,o_j) \notin R_{ij}^P$, the forward explicit relationship strength from knowledge point $o_i$ to knowledge point $o_j$ is set to $f_P(i,j)=0$; wherein, $R_{ij}^P$ represents a forward explicit relationship from $o_i$ to $o_j$, $R_{ij}^P=\{(o_i,o_j)|x_j \in H(y_i), i \neq j\}$, $x_i$ is the title of knowledge point $o_i$, $y_j$ is the explanation of knowledge point $o_i$, $H(y_i)$ is a set of knowledge points involved in $y_i$, i, j=1, 2, ..., n (n is the number of knowledge points).

Optionally, the method of setting knowledge point backward explicit relationship strength comprises: if $(o_i,o_j) \in R_{ij}^N$, the backward explicit relationship strength value from knowledge point $o_i$ to knowledge point $o_j$ is set to $f_N(i,j)=0.33$; if $(o_i,o_j) \notin R_{ij}^N$, the backward explicit relationship strength value from knowledge point $o_i$ to knowledge point $o_j$ is set to $f_N(i,j)=0$; wherein, $R_{ij}^N$ represents a backward explicit relationship from $o_i$ to $o_j$, $R_{ij}^N=\{(o_i,o_j)|x_i \in H(y_j), i \neq j\}$.

Optionally, the method of calculating knowledge point explicit relationships is:

$$R_{ij}^E = R_{ij}^P \cup R_{ij}^N$$

Wherein, $R_{ij}^E$ represents an explicit relationship from knowledge point $o_i$ to knowledge point $o_j$, $R_{ij}^N$ represents a backward explicit relationship from knowledge point $o_i$ to knowledge point $o_j$, $R_{ij}^P$ represents a forward explicit relationship from knowledge point $o_i$ to knowledge point $o_j$, and a set $R^E$ of explicit relationships among all knowledge points is:

$$R^E = \cup R_{ij}^E$$

The method of calculating knowledge point explicit relationship strength is:

$$f_E(i,j) = f_P(i,j) + f_N(i,j)$$

Wherein, $f_E(i,j)$ represents the explicit relationship strength value from knowledge point $o_i$ to knowledge point $o_j$, $f_P(i,j)$ represents the forward explicit relationship strength value from knowledge point $o_i$ to knowledge point $o_j$, $f_N(i,j)$ represents the backward explicit relationship strength value from knowledge point $o_i$ to knowledge point $o_j$;

relationship strength values are calculated for all knowledge points in the set of explicit relationships $R^E$ and are stored in an explicit relationship strength matrix E. A graph of knowledge point explicit relationships is generated according to the explicit relationship strength matrix E.

Optionally, the explicit relationship graph is a weighted and directed graph G. The weighted and directed graph G comprises edges, weight values and vertices. Wherein, the method of setting edges and weights comprises: a weight value of an edge from knowledge point $o_i$ to knowledge point $o_j$ in the weighted and directed graph G is set to $f_E(i,j)$; if $f_E(i,j)=0$, there not being an edge from knowledge point $o_i$ to knowledge point $o_j$ in the weighted and directed graph G, wherein $f_E(i,j)$ represents an explicit relationship weight value from knowledge point $o_i$ to knowledge point $o_j$; vertices of the weighted and directed graph G are the same as vertices in the explicit relationship strength matrix E, both representing knowledge points.

Optionally, the algorithm of generating a set of simple paths between two knowledge points comprises: an initial value of a set $D_{ik}$ is set to an edge from vertex i to vertex j, if a path in the set $D_{ik}$ is intersected with a path in a set $D_{ik}$ at a vertex j, a simple path from vertex i to vertex k is obtained through merging the two paths and is stored in the set $D_{ik}$; wherein, i, j, k=1, 2, ..., n (n is the number of vertices), all values of k, i, j are traversed in ascending order and are stored in the set $D_{ik}$.

Optionally, from the set of simple paths between two knowledge points, the first k simple paths are obtained using a deletion algorithm to approximate the set of all simple paths.

Optionally, the method of calculating implicit relationship strength corresponding to each simple path in the set of simple paths is: $\Pi f_E(m,n)$, wherein $(o_m,o_n) \in R_{mn}^E$, $f_E(m,n)$ is the implicit relationship strength from knowledge point $o_m$ to knowledge point $o_n$, m, n represent indexes of knowledge points; $(o_m,o_n)$ is an edge on the simple path.

Optionally, the predetermined threshold of implicit relationship strength is set to wherein $0.05 \leq \xi \leq 0.4$. Preferably, the predetermined threshold of implicit relationship strength is $\xi=0.1$.

A system for obtaining knowledge point implicit relationships, comprising:

a knowledge point implicit relationship graph establishment module for establishing a graph of knowledge point explicit relationships according to all knowledge points and their explanations; a simple path set calculation module for, according to the graph of knowledge point explicit relationships, calculating a set of simple paths between two knowledge points; an implicit relationship strength calculation module for calculating implicit relationship strength values corresponding to each simple path in the set of simple paths; a significant implicit relationship strength setting module for comparing implicit relationship strength of each simple path to set an implicit relationship strength value of a path having the largest value and greater than a predetermined threshold as significant implicit relationship strength.

Optionally, the knowledge point implicit relationship graph establishment module comprises: a knowledge point forward explicit relationship strength setting unit for calculating knowledge point forward explicit relationships according to a set of all knowledge points and their explanations and setting knowledge point forward explicit relationship strength values; a knowledge point backward explicit relationship strength setting unit for calculating knowledge point backward explicit relationships according to a set of all knowledge points and their explanations and setting knowledge point backward explicit relationship strength values; a knowledge point explicit relationship strength calculation unit for, according to the knowledge point forward explicit relationships and the knowledge point backward explicit relationships, calculating knowledge point explicit relationships and calculating explicit relationship strength values of the knowledge points; an explicit relationship graph establishment unit for, according to the explicit relationship strength of the knowledge points, establishing a graph of knowledge point explicit relationships.

Optionally, the method of setting knowledge point forward explicit relationship strength values comprises: if $(o_i,o_j) \in R_{ij}^P$, the forward explicit relationship strength value from knowledge point $o_i$ to knowledge point $o_j$ is set to $f_P(i,j)=0.66$; if $(o_i,o_j) \notin R_{ij}^P$, the forward explicit relationship strength value from knowledge point $o_i$ to knowledge point $o_j$ is set to $f_P(i,j)=0$; wherein, $R_{ij}^P$ represents a forward explicit relationship from $o_i$ to $o_j$, $R_{ij}^P=\{(o_i,o_j)|x_j \in H(y_i),$ $i \neq j$}, $x_i$ is the title of knowledge point $o_i$, $y_j$ is the explanation of knowledge point $o_i$, $H(y_i)$ is a set of knowledge points involved in $y_i$, i, j=1, 2, . . . , n (n is the number of knowledge points).

Optionally, the method of setting knowledge point backward explicit relationship strength values comprises: if $(o_i,o_j) \in R_{ij}^N$, the backward explicit relationship strength value from knowledge point $o_i$ to knowledge point $o_j$ is set to $f_N(i,j)=0.33$; if $(o_i,o_j) \notin R_{ij}^N$, the backward explicit relationship strength value from knowledge point $o_i$ to knowledge point $o_j$ is set to $f_N(i,j)=0$; wherein, $R_{ij}^N$ represents a backward explicit relationship from $o_i$ to $o_j$, $R_{ij}^N = \{(o_i,o_j) | x_i \in H(y_i), i \neq j\}$.

Optionally, the method of calculating knowledge point explicit relationships is:

$$R_{ij}^E = R_{ij}^P \cup R_{ij}^N$$

Wherein, $R_{ij}^E$ represents an explicit relationship from knowledge point $o_i$ to knowledge point $o_j$, $R_{ij}^N$ represents a backward explicit relationship from knowledge point $o_i$ to knowledge point $o_j$, $R_{ij}^P$ represents a forward explicit relationship from knowledge point $o_i$ to knowledge point $o_j$, and a set $R^E$ of explicit relationships among all knowledge points is:

$$R^E = \cup R_{ij}^E$$

The method of calculating knowledge point explicit relationship strength is:

$$f_E(i,j) = f_P(i,j) f_N(i,j)$$

Wherein, $f_E(i,j)$ represents the explicit relationship strength from knowledge point $o_i$ to knowledge point $o_j$, $f_P(i,j)$ represents the forward explicit relationship strength value from knowledge point $o_i$ to knowledge point $o_j$, $f_N(i,j)$ represents the backward explicit relationship strength value from knowledge point $o_i$ to knowledge point $o_j$;

relationship strength values are calculated for all knowledge points in the set of explicit relationships $R^E$ and are stored in an explicit relationship strength matrix E. A graph of knowledge point explicit relationships is generated according to the explicit relationship strength matrix E.

Optionally, the explicit relationship graph is a weighted and directed graph G. The weighted and directed graph G comprises edges, weight values and vertices. Wherein, the method of setting edges and weights comprises: a weight value of an edge from knowledge point $o_i$ to knowledge point $o_j$ in the weighted and directed graph G is set to $f_E(i,j)$; if $f_E(i,j)=0$, there not being an edge from knowledge point $o_i$ to knowledge point $o_j$ in the weighted and directed graph G, wherein $f_E(i,j)$ represents an explicit relationship weight value from knowledge point $o_i$ to knowledge point $o_j$; vertices of the weighted and directed graph G are the same as vertices in the explicit relationship strength matrix E, both representing knowledge points.

Optionally, the algorithm of generating a set of simple paths between two knowledge points comprises: an initial value of a set $D_{ik}$ is set to an edge from vertex i to vertex j, if a path in the set $D_{jk}$ is intersected with a path in a set $D_{ik}$ at a vertex j, a simple path from vertex i to vertex k is obtained through merging the two paths and is stored in the set $D_{ik}$; wherein, i, j, k=1, 2, . . . , n (n is the number of vertices), all values of k, i, j are traversed in ascending order and are stored in the set $D_{ik}$.

Optionally, from the set of simple paths between two knowledge points, the first k simple paths are obtained using a deletion algorithm to approximate the set of all simple paths.

Optionally, in the implicit relationship strength calculation module, the method of calculating implicit relationship strength values corresponding to each simple path in the set of simple paths is: $\Pi f_E(m,n)$, wherein $(o_m,o_n) \in R_{mn}^E$, $f_E(m,n)$ is the implicit relationship strength value from knowledge point $o_m$ to knowledge point $o_n$, m, n represent indexes of knowledge points; $(o_m,o_n)$ is an edge on the simple path.

Optionally, the predetermined threshold of implicit relationship strength is set to $\xi$, wherein $0.05 \leq \xi \leq 0.4$. Preferably, the predetermined threshold of implicit relationship strength is $\xi=0.1$.

One or more computer readable medium having stored thereon computer-executable instructions that when executed by a computer perform a method of obtaining knowledge point implicit relationships, the method comprising: establishing a graph of knowledge point explicit relationships according to all knowledge points and their explanations; according to the graph of knowledge point explicit relationships, calculating a set of simple paths between two knowledge points; calculating implicit relationship strength corresponding to each simple path in the set of simple paths; comparing implicit relationship strength of each simple path to set implicit relationship strength of a path having the largest value and greater than a predetermined threshold as the most significant implicit relationship strength.

Compared with the prior art, the method of obtaining knowledge point implicit relationships disclosed in this disclosure has the one or more advantages below:

(1) the method of obtaining knowledge point implicit relationships in this disclosure comprises the following steps: establishing a graph of knowledge point explicit relationships according to all knowledge points and their explanations; according to the graph of knowledge point explicit relationships, calculating a set of simple paths between two knowledge points; calculating implicit relationship strength corresponding to each simple path in the set of simple paths; comparing implicit relationship strength of each simple path to set implicit relationship strength of a path having the largest value and greater than a predetermined threshold as the most significant implicit relationship strength. The above method may effectively avoid the problem in the prior art of insufficient accuracy of the implicit relationship acquisition method in the prior art, in which implicit relationships between knowledge points are only obtained based on relationship strength between knowledge points and a relationship strength ratio, and no normalization is performed for relationship strength, causing a lack of an absolute measurable value for the determination of relationship strength and making it difficult to obtain representative implicit relationships.

(2) the method of obtaining knowledge point implicit relationships in this disclosure is based on explicit relationships, through the normalization of forward explicit relationships and backward explicit relationship strength values, explicit relationship strength values are set in a range [0, 0.99] to simplify calculation; meanwhile, implicit relationship strength values are also restricted in the range [0, 0.99] to provide an absolute measurable value used for obtaining the most representative implicit relationships based on knowledge point explicit relationships in a global space.

(3) According the method of obtaining knowledge point implicit relationships of this disclosure, an algorithm suggested by Frank Rubin is adopted as the algorithm for obtaining a set of simple paths between two knowledge points: in the algorithm for obtaining a set of simple paths, simple path calculation is performed by merging two paths into a simple path only if the two paths are intersected at a vertex to obtain a set of simple paths between two knowledge points. This method is simple, convenient for calculation, and is easy to implement.

(4) According the method of obtaining knowledge point implicit relationships of this disclosure, when obtaining the set of simple paths between two knowledge points, the first K simple paths are obtained using a deletion algorithm. The main idea of the deletion algorithm is to delete an edge from an existing path in a directed graph and search a substitutive edge to find out a next optional simple path. With this method, a new vertex is obtained through expansion based on a previous set of vertices while inheriting an adjacent edge of the expanded vertex, which is suitable for finding the first K simple paths between knowledge points. This method is simple, convenient for calculation, and is easy to implement.

(5) According the method of obtaining knowledge point implicit relationships of this disclosure, knowledge point explicit relationship strength is obtained through calculating knowledge point forward explicit relationship strength and backward explicit relationship strength. The method of evaluating relationship strength in two directions may further improve the accuracy of knowledge point explicit relationship strength.

(6) According the method of obtaining knowledge point implicit relationships of this disclosure, through converting an explicit relationship strength matrix to a weighted and directed graph, the calculation of simple paths between knowledge points is simplified, resulting in easy algorithm implementation and improved operation speed.

(7) According the method of obtaining knowledge point implicit relationships of this disclosure, through setting a predetermined threshold of implicit relationship strength, some simple paths having week implicit relationships may be filtered out to directly remove paths that are actually meaningless.

(8) With a system for obtaining knowledge point implicit relationships of this disclosure, using the method of obtaining knowledge point implicit relationships, it is possible to avoid the problem in the prior art of insufficient accuracy of the implicit relationship acquisition method in the prior art, in which implicit relationships between knowledge points are only obtained based on relationship strength between knowledge points and a relationship strength ratio, and no normalization is performed for relationship strength, causing a lack of an absolute measurable value for the determination of relationship strength and making it difficult to obtain representative implicit relationships.

BRIEF DESCRIPTION OF THE DRAWINGS

For a complete understanding of this invention, a description will be given with reference to the accompanying drawings, wherein.

DETAILED DESCRIPTION OF THE PREFERRED EMBODIMENT

Embodiment 1

Figure 1:
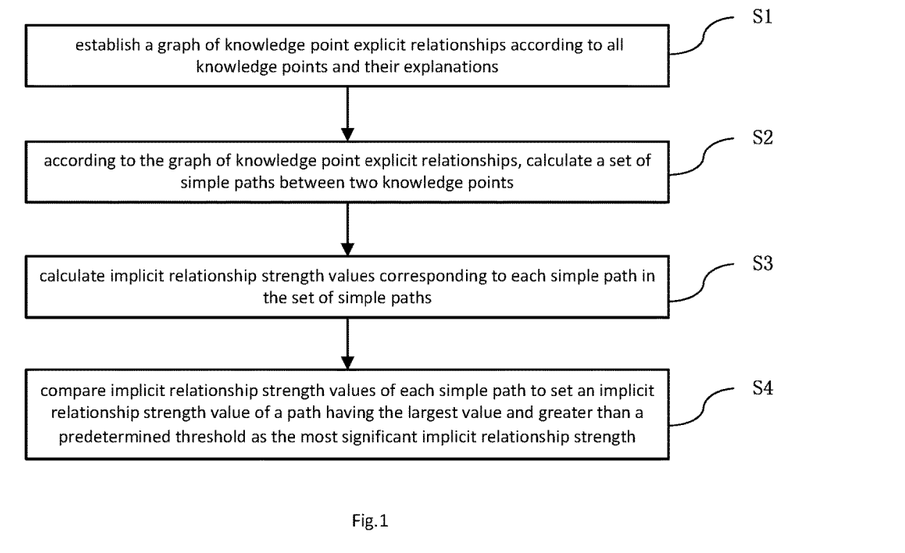
FIG. 1 is a flowchart of a method of obtaining knowledge point implicit relationships according to an embodiment of this disclosure.

A flowchart of a method of obtaining knowledge point implicit relationships provided in this embodiment is shown in FIG. 1. Knowledge points discussed in this embodiment are knowledge interaction units, representing concepts or entries, such as Qin Shi Huang, Tang Dynasty, Hundred Days' Reform.

This embodiment provides a method of obtaining knowledge point implicit relationships, which is illustrated with an example of finding knowledge point implicit relationships in an encyclopedia. The encyclopedia comprises documents having titles of knowledge points and explanation text of those knowledge points. Knowledge point information contained in the encyclopedia is defined as $O=\{o_1, o_2, \ldots, o_n\}$, wherein $o_i$ (i=1, ..., n) represents a knowledge point, a set of all knowledge points and their explanations is $A=\{(x_i, y_i), i=1, \ldots, n\}$, the method particularly comprising the following steps.

S1: establish a graph of knowledge point explicit relationships according to all knowledge points and their explanations. In a specific embodiment, the particular step is as follows:

S11: calculate knowledge point forward explicit relationships according to all knowledge points and their explanations, and set knowledge point forward explicit relationship strength values.

The method of setting knowledge point forward explicit relationship strength values comprises:

if $(o_i, o_j) \in R_{ij}^P$, the forward explicit relationship strength value from knowledge point $o_i$ to knowledge point $o_j$ is set to $f_P(i,j)=0.66$;

if $(o_i, o_j) \notin R_{ij}^P$, the forward explicit relationship strength value from knowledge point $o_i$ to knowledge point $o_j$ is set to $f_P(i,j)=0$;

wherein, $R_{ij}^P$ represents a forward explicit relationship from $o_i$ to $o_j$, $R_{ij}^P=\{(o_i,o_j)|x_j \in H(y_i), i \neq j\}$, $x_i$ is the title of knowledge point $o_i$, $y_j$ is the explanation of knowledge point $o_j$, $H(y_i)$ is a set of knowledge points involved in $y_i$, i, j=1, 2, ..., n (n is the number of knowledge points).

S12: calculate knowledge point backward explicit relationships according to all knowledge points and their explanations, and set knowledge point backward explicit relationship strength values.

The method of setting knowledge point backward explicit relationship strength values comprises:

if $(o_i, o_j) \notin R_{ij}^N$, the backward explicit relationship strength value from knowledge point $o_i$ to knowledge point $o_j$ is set to $f_N(i,j)=0.33$;

if $(o_i, o_j) \in R_{ij}^N$, the backward explicit relationship strength value from knowledge point $o_i$ to knowledge point $o_j$ is set to $f_N(i,j)=0$;

wherein, RN represents a backward explicit relationship from $o_i$ to $o_j$, $R_{ij}^N=\{(o_i,o_j)|x_j \notin H(y_i), i \neq j\}$.

S13: calculate knowledge point explicit relationships according to the knowledge point forward explicit relationships and the knowledge point backward explicit relationships, and calculate knowledge point explicit relationship strength values.

The method of calculating knowledge point explicit relationships is:

$$R_{ij}^E = R_{ij}^P \cup R_{ij}^N$$

Wherein, $R_{ij}^E$ represents an explicit relationship from knowledge point $o_i$ to knowledge point $o_j$, $R_{ij}^N$ represents a backward explicit relationship from knowledge point $o_i$ to knowledge point $o_j$, $R_{ij}^P$ represents a forward explicit relationship from knowledge point $o_i$ to knowledge point $o_j$, and a set $R^E$ of explicit relationships among all knowledge points is:

$$R^E = \cup R_{ij}^E$$

The method of calculating knowledge point explicit relationship strength values is:

$$f_E(i,j)=f_P(i,j)+f_N(i,j)$$

Wherein, $f_E(i,j)$ represents the explicit relationship strength value from knowledge point $o_i$ to knowledge point $o_j$, $f_P(i,j)$ represents the forward explicit relationship strength value from knowledge point $o_i$ to knowledge point $o_j$, $f_N(i,j)$ represents the backward explicit relationship strength value from knowledge point $o_i$ to knowledge point $o_j$;

According to the method of obtaining knowledge point implicit relationships, knowledge point explicit relationship strength is obtained through calculating knowledge point forward explicit relationship strength and backward explicit relationship strength. The method of evaluating relationship strength in two directions may further improve the accuracy of knowledge point explicit relationship strength.

Relationship strength values are calculated for all knowledge points in the set of explicit relationships $R^E$ and are stored in an explicit relationship strength matrix E. A graph of knowledge point explicit relationships is generated according to the explicit relationship strength matrix E.

According to the method of obtaining knowledge point implicit relationships in this embodiment, based on explicit relationships, through the normalization of forward explicit relationships and backward explicit relationship strength, explicit relationship strength values are set in a range [0, 0.99] to simplify calculation; meanwhile, implicit relationship strength values are also restricted in the range [0, 0.99] to provide an absolute measurable value used for obtaining the most representative implicit relationships based on knowledge point explicit relationships in a global space.

S14: according to the explicit relationship strength of the knowledge points, establish a graph of knowledge point explicit relationships. The explicit relationship graph is a weighted and directed graph G, comprising edges, weights and vertices, wherein, the method of setting edges and weights comprises:

a weight value of an edge from knowledge point $o_i$ to knowledge point $o_j$ in the weighted and directed graph G is set to $f_E(i,j)$; if $f_E(i,j)=0$, there not being an edge from knowledge point $o_i$ to knowledge point $o_j$ in the weighted and directed graph G, wherein $f_E(i,j)$ represents an explicit relationship weight value from knowledge point $o_i$ to knowledge point $o_j$;

vertices of the weighted and directed graph G are the same as vertices in the explicit relationship strength matrix E, both representing knowledge points.

The weighted and directed graph G is an assistant graph used for calculating simple paths. Through converting the explicit relationship strength matrix to a weighted and directed graph, the calculation of simple paths between knowledge points is simplified, resulting in easy algorithm implementation and improved operation speed.

S2: according to the graph of knowledge point explicit relationships, calculate a set of simple paths between two knowledge points. An algorithm suggested by Frank Rubin is adopted as the algorithm for obtaining a set of simple paths between two knowledge points (see Frank Rubin. Enumerating all simple paths in a graph[J]. IEEE Transactions on Circuits and Systems, 1978, 25(8):641-642 for details).

An initial value of a set $D_{ik}$ is set to an edge from vertex i to vertex j, if a path in the set $D_{ik}$ is intersected with a path in a set $D_{jk}$ at a vertex j, a simple path from vertex i to vertex k is obtained through merging the two paths and is stored in the set $D_{ik}$. This method is simple, convenient for operations and is easy to implement. Wherein, i, j, k=1, 2, . . . , n (n is the number of vertices), all values of k, i, j are traversed in ascending order and are stored in the set $D_{ik}$. All simple paths from vertex i to vertex k are stored in the set $D_{ik}$.

A simple path $p_{ij}=\langle o_i=o_1', o_2', \ldots, o_{l-1}', o_l'=o_j\rangle$ from knowledge point $o_f$ to knowledge point $o_i$ comprises a potential relationship between these knowledge points, which reveals an implicit relationship from knowledge point $o_i$ to knowledge point $o_j$ in one dimension, wherein for all knowledge point relationships on path $p_{ij}$, the set thereof $S_{ij}=\{(o_i,o_2'), (o_{l-1}'o_j), (o_k'o_{k+1}')|k=2, \ldots, 1-2\}\subseteq R^E$, i.e., all knowledge point relationships on path $p_{ij}$ are explicit relationships, the number of simple paths from knowledge point $o_i$ to knowledge point $o_j$ is equal to or greater than zero; if the number of simple paths is zero, it indicates there is not any implicit relationship between knowledge point $o_i$ to knowledge point $o_j$.

In the algorithm for obtaining a set of simple paths, simple path calculation is performed by merging two paths into a simple path only if the two paths are intersected at a vertex to obtain a set of simple paths between two knowledge points. This method is simple, convenient for calculation, and is easy to implement.

S3: calculate implicit relationship strength values corresponding to each simple path in the set of simple paths.

The method of calculating implicit relationship strength values corresponding to each simple path in the set of simple paths is: $\Pi f_E(m,n)$, wherein $(o_m,o_n)\in R_{mn}^E$, $f_E(m,n)$ is the implicit relationship strength value from knowledge point $o_m$ to knowledge point $o_n$, m, n represent indexes of knowledge points; $(o_m o_n)$ is an edge on the simple path.

S4: compare implicit relationship strength values of each simple path to set implicit relationship strength value of a path having the largest value and greater than a predetermined threshold as the most significant implicit relationship strength. In an embodiment, the predetermined implicit relationship strength threshold is set to $\xi$, wherein $0.05\leq\xi\leq 0.4$. Preferably, the implicit relationship strength threshold is $\xi=0.1$. That is, the implicit relationship strength value from knowledge point $o_i$ to knowledge point $o_j$ is set to the largest value of implicit relationship strength corresponding to the simple path, and the implicit relationship strength value of a path having $f_r(i,j)>0.1$ is set the most significant implicit relationship strength.

In other alternative embodiments, the predetermined implicit relationship strength threshold $\xi$ may be set to 0.15, 0.2, 0.3, 0.4 and other different values selected according to demands of users or the obtained implicit relationship strength.

Through setting a predetermined threshold of implicit relationship strength, some simple paths having week implicit relationships may be filtered out to directly remove paths that are actually meaningless.

Embodiment 2

Except for step S3 of this embodiment, other steps are the same as that in embodiment 1. Step S3: according to the graph of knowledge point explicit relationships, calculate a set of simple paths between two knowledge points.

In step S3, an algorithm suggested by Frank Rubin is adopted as the algorithm for obtaining a set of simple paths between two knowledge points (see Frank Rubin. Enumerating all simple paths in a graph[J]. IEEE Transactions on Circuits and Systems, 1978, 25(8):641-642 for details).

A simple path $p_{ij}=\langle o_i=o_1', o_2', \ldots, o_{l-1}', o_l'=o_j\rangle$ from knowledge point $o_i$ to knowledge point $o_j$ comprises a potential relationship between these knowledge points, which reveals an implicit relationship from knowledge point $o_i$ to knowledge point $o_j$ in one dimension, wherein for (all knowledge point relationships on path $p_{ij}$, the set thereof $S_{ij}=\{(o_i,o_2'), (o_{l-1}'o_j), (o_k'o_{k+1}')|k=2, \ldots, 1-2\} \subseteq R^E$, i.e., all knowledge point relationships on path $p_{ij}$ are explicit relationships, the number of simple paths from knowledge point $o_i$ to knowledge point $o_j$ is equal to or greater than zero; if the number of simple paths is zero, it indicates there is not any implicit relationship between knowledge point $o_i$ to knowledge point $o_j$.

The main idea of the deletion algorithm is to delete an edge from an existing path in a directed graph and search a substitutive edge to find out a next optional simple path. With this method, a new vertex is obtained through expansion based on a previous set of vertices while inheriting an adjacent edge of the expanded vertex, which is suitable for finding the first K simple paths between knowledge points. This method is simple, convenient for calculation, and is easy to implement.

The method of obtaining knowledge point implicit relationships in this embodiment comprises the following steps: establishing a graph of knowledge point explicit relationships according to explicit relationship strength of knowledge points; according to the graph of knowledge point explicit relationships, calculating a set of simple paths between two knowledge points; calculating implicit relationship strength corresponding to each simple path in the set of simple paths; comparing implicit relationship strength of each simple path to set implicit relationship strength of a path having the largest value and greater than a predetermined threshold as the most significant implicit relationship strength. The above method may effectively avoid the problem in the prior art of insufficient accuracy of the implicit relationship acquisition method in the prior art, in which implicit relationships between knowledge points are only obtained based on relationship strength between knowledge points and a relationship strength ratio, and no normalization is performed for relationship strength, causing a lack of an absolute measurable value for the determination of relationship strength and making it difficult to obtain representative implicit relationships.

Embodiment 3

Figure 2:
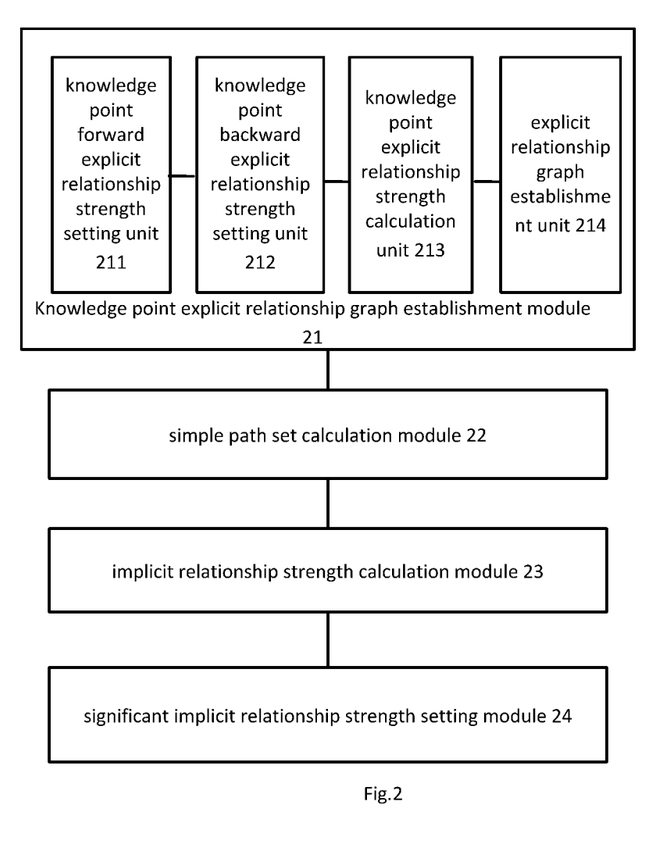
FIG. 2 is a structure diagram of a system for obtaining knowledge point implicit relationships according to an embodiment of this disclosure.

FIG. 2 is a structure diagram of a system for obtaining knowledge point implicit relationships according to an embodiment of this disclosure. The system for obtaining knowledge point implicit relationships provided in this embodiment comprises: a knowledge point implicit relationship graph establishment module 21 for establishing a graph of knowledge point explicit relationships according to all knowledge points and their explanations; a simple path set calculation module 22 for, according to the graph of knowledge point explicit relationships, calculating a set of simple paths between two knowledge points; an implicit relationship strength calculation module 23 for calculating implicit relationship strength values corresponding to each simple path in the set of simple paths; a significant implicit relationship strength setting module 24 for comparing implicit relationship strength values of each simple path to set the implicit relationship strength value of a path having the largest value and greater than a predetermined threshold as significant implicit relationship strength.

In one embodiment, the knowledge point implicit relationship graph establishment module 21 comprises a knowledge point forward explicit relationship strength setting unit 211 for calculating knowledge point forward explicit relationships according to a set of all knowledge points and their explanations and setting knowledge point forward explicit relationship strength values; a knowledge point backward explicit relationship strength setting unit 212 for calculating knowledge point backward explicit relationships according to a set of all knowledge points and their explanations and setting knowledge point backward explicit relationship strength values; a knowledge point explicit relationship strength calculation unit 213 for, according to the knowledge point forward explicit relationships and the knowledge point backward explicit relationships, calculating knowledge point explicit relationships and calculating explicit relationship strength values of the knowledge points; an explicit relationship graph establishment unit 214 for, according to the explicit relationship strength values of the knowledge points, establishing a graph of knowledge point explicit relationships.

The method of setting knowledge point forward explicit relationship strength values comprises: if $(o_i,o_j) \in R_{ij}^P$, the forward explicit relationship strength value from knowledge point $o_i$ to knowledge point $o_j$ is set to $f_P(i,j)=0.66$; if $(o_i,o_j) \notin R_{ij}^P$, the forward explicit relationship strength value from knowledge point $o_i$ to knowledge point $o_j$ is set to $f_P(i,j)=0$; wherein, $R_{ij}^P$ represents a forward explicit relationship from $o_i$ to $o_j$, $R_{ij}^P=\{(o_i,o_j)|x_j \in H(y_i), i \neq j\}$, $x_i$ is the title of knowledge point $o_i$, $y_j$ is the explanation of knowledge point $o_i$, $H(y_i)$ is a set of knowledge points involved in $y_j$, i, j=1, 2, . . . , n (n is the number of knowledge points).

The method of setting knowledge point backward explicit relationship strength values comprises: if $(o_i,o_j) \in R_{ij}^N$, the backward explicit relationship strength from knowledge point $o_i$ to knowledge point $o_j$ is set to $f_N(i,j)=0.33$; if $(o_i,o_j) \notin R_{ij}^N$, the backward explicit relationship strength from knowledge point $o_i$ to knowledge point $o_j$ is set to $f_N(i,j)=0$; wherein, $R_{ij}^N$ represents a backward explicit relationship from $o_i$ to $o_j$, $R_{ij}^N=\{(o_i,o_j)|x_j \in H(y_i), i \neq j\}$.

The method of calculating knowledge point explicit relationships is:

$$R_{ij}^E = R_{ij}^P \cup R_{ij}^N$$

Wherein, $R_{ij}^E$ represents an explicit relationship from knowledge point $o_i$ to knowledge point $o_j$, $R_{ij}^N$ represents a backward explicit relationship from knowledge point $o_i$ to knowledge point $o_j$, $R_{ij}^P$ represents a forward explicit relationship from knowledge point $o_i$ to knowledge point $o_j$, and a set $R^E$ of explicit relationships among all knowledge points is:

$$R^E = \cup R_{ij}^E$$

The method of calculating knowledge point explicit relationship strength is:

$$f_E(i,j) = f_P(i,j) f_N(i,j)$$

Wherein, $f_E(i,j)$ represents the explicit relationship strength value from knowledge point $o_i$ to knowledge point $o_j$, $f_P(i,j)$ represents the forward explicit relationship strength value from knowledge point $o_i$ to knowledge point $o_j$, $f_N(i,j)$ represents the backward explicit relationship strength value from knowledge point $o_i$ to knowledge point $o_j$;

relationship strength values are calculated for all knowledge points in the set of explicit relationships $R^E$ and are stored in an explicit relationship strength matrix E. A graph of knowledge point explicit relationships is generated according to the explicit relationship strength matrix E.

The explicit relationship graph is a weighted and directed graph G. The weighted and directed graph G comprises edges, weight values and vertices. Wherein, the method of setting edges and weights comprises: a weight value of an edge from knowledge point $o_i$ to knowledge point $o_j$ in the weighted and directed graph G is set to $f_E(i,j)$; if $f_E(i,j)=0$, there not being an edge from knowledge point $o_i$ to knowledge point $o_j$ in the weighted and directed graph G, wherein $f_E(i,j)$ represents an explicit relationship weight value from knowledge point $o_i$ to knowledge point $o_j$; vertices of the weighted and directed graph G are the same as vertices in the explicit relationship strength matrix E, both representing knowledge points.

In this embodiment, the algorithm of generating a set of simple paths between two knowledge points comprises: an initial value of a set $D_{ik}$ is set to an edge from vertex i to vertex j, if a path in the set $D_{ik}$ is intersected with a path in a set $D_{jk}$ at a vertex j, a simple path from vertex i to vertex k is obtained through merging the two paths and is stored in the set $D_{ik}$; wherein, i, j, k=1, 2, . . . , n (n is the number of vertices), all values of k, i, j are traversed in ascending order and are stored in the set $D_{ik}$.

As an alternative embodiment, from the set of simple paths between two knowledge points, the first k simple paths are obtained using a deletion algorithm to approximate the set of all simple paths.

In the implicit relationship strength calculation module, the method of calculating implicit relationship strength values corresponding to each simple path in the set of simple paths is: $\Pi f_E(m,n)$, wherein $(o_m, o_n) \in R_{mn}^E$, $f_E(m,n)$ is the implicit relationship strength value from knowledge point $o_m$ to knowledge point $o_n$, m, n represent indexes of knowledge points; $(o_m o_n)$ is an edge on the simple path.

The predetermined threshold of implicit relationship strength is set to $\xi$, wherein $0.05 \leq \xi \leq 0.4$. Preferably, the predetermined threshold of implicit relationship strength is $\xi = 0.1$.

A system for obtaining knowledge point implicit relationships is provided in this embodiment, using the method of obtaining knowledge point implicit relationships, it is possible to avoid the problem in the prior art of insufficient accuracy of the implicit relationship acquisition method in the prior art, in which implicit relationships between knowledge points are only obtained based on relationship strength between knowledge points and a relationship strength ratio, and no normalization is performed for relationship strength, causing a lack of an absolute measurable value for the determination of relationship strength and making it difficult to obtain representative implicit relationships.

Embodiment 4

An application example is provided in this embodiment.

There is an explicit relationship between Qin ShiHuang and Li Si, which has an explicit relationship strength value of 0.5. This relationship is a directed edge e1 from Qin ShiHuang to Li Si, with a weight value of 0.5. There is an explicit relationship between Li Si and Han Fei, which has an explicit relationship strength value of 0.3, which is represented as a directed edge e1 from Li SiHuang to Han Fei with a weight value of 0.5 in the diagram.

Based on the above information, a simple path from Qin ShiHuang to Han Fei is obtained, the simple path starting from Qin ShiHuang, passing through e1, Li Si, and ending at Han Fei. This simple path represents an implicit relationship from Qin ShiHuang to Han Fei, with implicit relationship strength of 0.5*0.3=0.15.

Implicit relationship strength values corresponding to other simple paths between Qin ShiHuang and Han Fei may be obtained through calculation. For example, other two simple paths correspond to implicit relationship strength of 0.1 and 0.12 respectively. Setting $\xi = 0.1$, the significant implicit relationship strength from Qin ShiHuang to Han Fei is 0.15.

Obviously, the above embodiments are merely examples given for clear description, but not limitations of this invention. For those skilled in the art, other modifications or variations may be made based on the above description, which will not be and cannot be listed exhaustively herein. These apparent modifications or variations derived are still within the protection scope of this invention.

Those skilled in the art should understand that the embodiments of this application can be provided as method, system or products of computer programs. Therefore, this application can use the forms of entirely hardware embodiment, entirely software embodiment, or embodiment combining software and hardware. Moreover, this application can use the form of the product of computer programs to be carried out on one or multiple storage media (including but not limit to disk memory, CD-ROM, optical memory etc.) comprising programming codes that can be executed by computers.

This application is described with reference to the method, equipment (system) and the flow charts and/or block diagrams of computer program products according to the embodiments of the present invention. It should be understood that each flow and/or block in the flowchart and/or block diagrams as well as the combination of the flow and/or block in the flowchart and/or block diagram can be achieved through computer program commands Such computer program commands can be provided to general computers, special-purpose computers, embedded processors or any other processors of programmable data processing equipment so as to generate a machine, so that a device for realizing one or multiple flows in the flow diagram and/or the functions specified in one block or multiple blocks of the block diagram is generated by the commands to be executed by computers or any other processors of the programmable data processing equipment.

Such computer program commands can also be stored in readable memory of computers which can lead computers or other programmable data processing equipment to working in a specific style so that the commands stored in the readable memory of computers generate the product of command device; such command device can achieve one or multiple flows in the flowchart and/or the functions specified in one or multiple blocks of the block diagram.

Such computer program commands can also be loaded on computers or other programmable data processing equipment so as to carry out a series of operation steps on computers or other programmable equipment to generate the process to be achieved by computers, so that the commands to be executed by computers or other programmable equipment achieve the one or multiple flows in the flowchart and/or the functions specified in one block or multiple blocks of the block diagram.

Although preferred embodiments of this application are already described, once those skilled in the art understand basic creative concept, they can make additional modification and alteration for these embodiments. Therefore, the appended claims are intended to be interpreted as encompassing preferred embodiments and all the modifications and alterations within the scope of this application.

What is claimed is:

1. A method for obtaining knowledge point implicit relationships executed by a computer, the method comprises the following steps:
   calculating knowledge point forward explicit relationships according to all knowledge points and their explanations and setting knowledge point forward explicit relationship strength values;
   calculating knowledge point backward explicit relationships according to a set of all knowledge points and their explanations and setting knowledge point backward explicit relationship strength values;
   according to the knowledge point forward explicit relationships and the knowledge point backward explicit relationships, calculating knowledge point explicit relationships and calculating explicit relationship strength values of the knowledge points;
   according to the explicit relationship strength values of the knowledge points, establishing a graph of knowledge point explicit relationships;
   calculating a set of simple paths between two knowledge points according to the graph of knowledge point explicit relationships;
   calculating implicit relationship strength values corresponding to each simple path in the set of simple paths; and
   comparing the implicit relationship strength values of each simple path to set an implicit relationship strength value of a path having the largest value and greater than a predetermined threshold as significant implicit relationship strength.

2. The method for obtaining knowledge point implicit relationships according to claim 1, characterized in that the method of setting knowledge point forward explicit relationship strength values comprises:
   if $(o_i,o_j) \in R_{ij}^P$, setting the forward explicit relationship strength value from knowledge point $o_i$ to knowledge point $o_j$ to $f_P(i,j)=0.66$;
   if $(o_i,o_j) \notin R_{ij}^P$, setting the forward explicit relationship strength value from knowledge point $o_i$ to knowledge point $o_j$ to $f_P(i,j)=0$;
   wherein, $R_{ij}^P$ represents a forward explicit relationship from $o_i$ to $o_j$, $R_{ij}^P=\{(o_i,o_j)|x_j \in H(y_i), i \neq j\}$, $x_i$ is the title of knowledge point $o_i$, $y_i$ is the explanation of knowledge point $o_i$, is a set of knowledge points involved in $y_i$, i, j=1, 2, . . . , n (n is the number of knowledge points); and/or
   the method of setting knowledge point backward explicit relationship strength values comprises:
   if $(o_i,o_j) \in R_{ij}^N$, setting the backward explicit relationship strength value from knowledge point $o_i$ to knowledge point $o_j$ to $f_N(i,j)=0.33$;
   if $(o_i,o_j) \notin R_{ij}^N$, setting the backward explicit relationship strength value from knowledge point $o_i$ to knowledge point $o_j$ to $f_N(i,j)=0$;
   wherein, $R_{ij}^N$ represents a backward explicit relationship from $o_i$ to $o_j$, $R_{ij}^N=\{(o_i,o_j)|x_i \in H(y_j), i \neq j\}$.

3. The method for obtaining knowledge point implicit relationships according to claim 1, characterized in that the method of calculating knowledge point explicit relationships is:

$$R_{ij}^E = R_{ij}^P \cup R_{ij}^N$$

Wherein, $R_{ij}^E$ represents an explicit relationship from knowledge point $o_i$ to knowledge point $o_j$, $R_{ij}^N$ represents a backward explicit relationship from knowledge point $o_i$ to knowledge point $o_j$, $R_{ij}^P$ represents a forward explicit relationship from knowledge point $o_i$ knowledge point $o_j$, and a set $R^E$ of explicit relationships among all knowledge points is:

$$R^E = \cup R_{ij}^E$$

the method of calculating knowledge point explicit relationship strength values is:

$$f_E(i,j) = f_P(i,j) + f_N(i,j)$$

wherein, $f_E(i,j)$ represents the explicit relationship strength value from knowledge point $o_i$ to knowledge point $o_j$, $f_P(i,j)$ represents the forward explicit relationship strength value from knowledge point $o_i$ to knowledge point $o_j$, $F_N(i,j)$ represents the backward explicit relationship strength value from knowledge point $o_i$ to knowledge point $o_j$;
relationship strength values are calculated for all knowledge points in the set of explicit relationships $R^E$ and are stored in an explicit relationship strength matrix E; a graph of knowledge point explicit relationships is generated according to the explicit relationship strength matrix E.

4. The method for obtaining knowledge point implicit relationships according to claim 1, characterized in that the explicit relationship graph is a weighted and directed graph G comprising edges, weight values and vertices, wherein, the method of setting edges and weights comprises:
   setting a weight value of an edge from knowledge point $o_i$ to knowledge point $o_j$ in the weighted and directed graph G to $f_E(i,j)$; if $f_E(i,j)=0$, there not being an edge from knowledge point $o_i$ to knowledge point $o_j$ in the weighted and directed graph G, wherein $f_E(i,j)$ represents an explicit relationship weight value from knowledge point $o_i$ to knowledge point $o_j$; vertices of the weighted and directed graph G are the same as vertices in the explicit relationship strength matrix E, both representing knowledge points.

5. The method for obtaining knowledge point implicit relationships according to claim 1, characterized in that the algorithm of generating a set of simple paths between two knowledge points comprises: setting an initial value of a set $D_{ik}$ to an edge from vertex i to vertex j; if a path in the set $D_{ik}$ is intersected with a path in a set $D_{jk}$ at a vertex j, merging the two paths to obtain a simple path from vertex i to vertex k and storing the simple path in the set $D_{ik}$;
   wherein, i, j, k=1, 2, . . . , n (n is the number of vertices), all values of k, i, j are traversed in ascending order and are stored in the set $D_{ik}$.

6. The method for obtaining knowledge point implicit relationships according to claim 1, characterized in that, from the set of simple paths between two knowledge points, the first k simple paths are obtained using a deletion algorithm to approximate the set of all simple paths.

7. The method for obtaining knowledge point implicit relationships according to claim 1, characterized in that the method of calculating implicit relationship strength values corresponding to each simple path in the set of simple paths is: $\Pi f_E(m,n)$, wherein $(o_m,o_n) \in R_{mn}^E$, $f_E(m,n)$ is the implicit relationship strength value from knowledge point $o_m$ to knowledge point $o_n$, m, n represent indexes of knowledge points; $(o_m, o_n)$ is an edge on the simple path.

8. The method for obtaining knowledge point implicit relationships according to claim 1, characterized in that the predetermined threshold of implicit relationship strength is set to $\xi$, wherein $0.05 \leq \xi \leq 0.4$, preferably, the predetermined threshold of implicit relationship strength is $\xi = 0.1$.

9. A system for obtaining knowledge point implicit relationships in a computer, the system comprises:
- a knowledge point implicit relationship graph comprising:
- a knowledge point forward explicit relationship strength setting unit for calculating knowledge point forward explicit relationships according to a set of all knowledge points and their explanations and setting knowledge point forward explicit relationship strength values;
- a knowledge point backward explicit relationship strength setting unit for calculating knowledge point backward explicit relationships according to a set of all knowledge points and their explanations and setting knowledge point backward explicit relationship strength values;
- a knowledge point explicit relationship strength calculation unit for, according to the knowledge point forward explicit relationships and the knowledge point backward explicit relationships, calculating knowledge point explicit relationships and calculating explicit relationship strength values of the knowledge points;
- an explicit relationship graph establishment unit for, according to the explicit relationship strength values of the knowledge points, establishing a graph of knowledge point explicit relationships;
- a simple path set calculation module for, according to the graph of knowledge point explicit relationships, calculating a set of simple paths between two knowledge points;
- an implicit relationship strength calculation module for calculating implicit relationship strength values corresponding to each simple path in the set of simple paths; and
- a significant implicit relationship strength setting module for comparing implicit relationship strength values of each simple path to set implicit relationship strength of a path having the largest value and greater than a predetermined threshold as significant implicit relationship strength.

10. The system for obtaining knowledge point implicit relationships according to claim 9, characterized in that the method of setting knowledge point forward explicit relationship strength by the knowledge point forward explicit relationship strength setting unit comprises:
- if $(o_i,o_j) \in R_{ij}^P$, setting the forward explicit relationship strength value from knowledge point $o_i$ to knowledge point $o_j$ to $f_P(i,j)=0.66$;
- if $(o_i,o_j) \notin R_{ij}^P$, setting the forward explicit relationship strength value from knowledge point $o_i$ to knowledge point $o_j$ to $f_P(i,j)=0$;
- wherein, $R_{ij}^P$ represents a forward explicit relationship from $o_i$ to $o_j$, $R_{ij}^P=\{(o_i,o_j)|x_i \in H(y_i), i \neq j\}$, $x_i$ is the title of knowledge point $o_i$, $y_i$ is the explanation of knowledge point $o_i$, $H(y_i)$ is a set of knowledge points involved in $y_i$, $i, j=1, 2, \ldots, n$ (n is the number of knowledge points), and/or the method of setting knowledge point backward explicit relationship strength values by the knowledge point backward explicit relationship strength setting unit comprises:
- if $(o_i,o_j) \in R_{ij}^N$, setting the backward explicit relationship strength value from knowledge point $o_i$ to knowledge point $o_j$ to $f_N(i,j)=0.33$;
- if $(o_i,o_j) \notin R_{ij}^N$, setting the backward explicit relationship strength value from knowledge point $o_i$ to knowledge point $o_j$ to $f_N(i,j)=0$;
- wherein, $R_{ij}^N$ represents a backward explicit relationship from $o_i$ to $o_j$, $R_{ij}^N=\{(o_i,o_j)|x_i \in H(y_i), i \neq j\}$.

11. The system for obtaining knowledge point implicit relationships according to claim 9, characterized in that the method of calculating knowledge point explicit relationships by the knowledge point explicit relationship strength calculation unit is:

$$R_{ij}^E = R_{ij}^P \cup R_{ij}^N$$

Wherein, $R_{ij}^E$ represents an explicit relationship from knowledge point $o_i$ to knowledge point $o_j$, $R_{ij}^N$ represents a backward explicit relationship from knowledge point $o_i$ to knowledge point $o_j$, $R_{ij}^P$ represents a forward explicit relationship from knowledge point $o_i$ to knowledge point $o_j$, and a set $R^E$ of explicit relationships among all knowledge points is:

$$R^E = \cup R_{ij}^E$$

the method of calculating knowledge point explicit relationship strength values is:

$$f_E(i,j) = f_P(i,j) + f_N(i,j)$$

wherein, $f_E(i,j)$ represents the explicit relationship strength value from knowledge point $o_i$ to knowledge point $o_j$, $f_P(i,j)$ represents the forward explicit relationship strength value from knowledge point $o_i$ to knowledge point $o_j$, $F_N(i,j)$ represents the backward explicit relationship strength value from knowledge point $o_i$ to knowledge point $o_j$;

relationship strength values are calculated for all knowledge points in the set of explicit relationships $R^E$ and are stored in an explicit relationship strength matrix E;

a graph of knowledge point explicit relationships is generated according to the explicit relationship strength matrix E.

12. The system for obtaining knowledge point implicit relationships according to claim 9, characterized in that the explicit relationship graph is a weighted and directed graph G, comprising edges, weight values and vertices, wherein, the method of setting edges and weights comprises:
- setting a weight value of an edge from knowledge point $o_i$ to knowledge point $o_j$ in the weighted and directed graph G to $f_E(i,j)$; if $f_E(i,j)=0$, there not being an edge from knowledge point $o_i$ to knowledge point $o_j$ in the weighted and directed graph G, wherein $f_E(i,j)$ represents an explicit relationship weight value from knowledge point $o_i$ to knowledge point $o_j$; vertices of the weighted and directed graph G are the same as vertices in the explicit relationship strength matrix E, both representing knowledge points.

13. The system for obtaining knowledge point implicit relationships according to claim 9, characterized in that the algorithm of generating a set of simple paths between two knowledge points by the simple path set calculation module comprises:
- setting an initial value of a set $D_{ik}$ to an edge from vertex i to vertex j; if a path in the set $D_{ik}$ is intersected with a path in a set $D_{jk}$ at a vertex j, obtaining a simple path from vertex i to vertex k through merging the two paths and storing the simple path in the set $D_{ik}$;
- wherein, $i, j, k=1, 2, \ldots, n$ (n is the number of vertices), all values of k, i, j are traversed in ascending order and are stored in the set $D_{ik}$.

14. The system for obtaining knowledge point implicit relationships according to claim 9, characterized in that, from the set of simple paths between two knowledge points, the first k simple paths are obtained using a deletion algorithm to approximate the set of all simple paths.

15. The system for obtaining knowledge point implicit relationships according to claim 9, characterized in that the method of calculating implicit relationship strength corresponding to each simple path in the set of simple paths by the implicit relationship strength calculation module is: $\Pi f_E(m,n)$, a wherein $(o_m,o_n) \in R_{mn}^E$, $f_E(m,n)$ is the implicit relationship strength value from knowledge point $o_m$ to knowledge point $o_n$, n represent indexes of knowledge points; $(o_m,o_n)$ is an edge on the simple path.

16. The system for obtaining knowledge point implicit relationships according to claim 9, characterized in that the predetermined threshold of implicit relationship strength is set to wherein $\xi$, $0.05 \leq \xi \leq 0.4$, Preferably, the predetermined threshold of implicit relationship strength is $\xi=0.1$.

17. One or more non-transitory computer readable mediums having stored thereon computer-executable instructions that when executed by a computer perform a method of obtaining knowledge point implicit relationships, the method comprising:

calculating knowledge point forward explicit relationships according to all knowledge points and their explanations and setting knowledge point forward explicit relationship strength values;

calculating knowledge point backward explicit relationships according to a set of all knowledge points and their explanations and setting knowledge point backward explicit relationship strength values;

according to the knowledge point forward explicit relationships and the knowledge point backward explicit relationships, calculating knowledge point explicit relationships and calculating explicit relationship strength values of the knowledge points;

according to the explicit relationship strength values of the knowledge points, establishing a graph of knowledge point explicit relationships;

according to the graph of knowledge point explicit relationships, calculating a set of simple paths between two knowledge points;

calculating implicit relationship strength corresponding to each simple path in the set of simple paths;

comparing implicit relationship strength values of each simple path to set implicit relationship strength value of a path having the largest value and greater than a predetermined threshold as the most significant implicit relationship strength.

* * * * *